United States Patent
Wang

(10) Patent No.: US 11,981,444 B2
(45) Date of Patent: May 14, 2024

(54) PARALLEL HYBRID POWER PLANT WITH HOLLOW MOTOR

(71) Applicant: Pratt & Whitney Canada Corp., Longueuil (CA)

(72) Inventor: Xi Wang, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/075,787

(22) Filed: Dec. 6, 2022

(65) Prior Publication Data

US 2023/0097282 A1    Mar. 30, 2023

Related U.S. Application Data

(63) Continuation of application No. 17/142,085, filed on Jan. 5, 2021.

(51) Int. Cl.
*F16H 1/28* (2006.01)
*B64D 27/02* (2006.01)
(Continued)

(52) U.S. Cl.
CPC .............. *B64D 27/02* (2013.01); *B64D 27/24* (2013.01); *B64D 33/08* (2013.01); *F16H 1/28* (2013.01); *F16H 57/02* (2013.01); *F16H 57/0416* (2013.01); *B64D 2027/026* (2013.01); *F16H 2057/02034* (2013.01); *F16H 2057/02043* (2013.01)

(58) Field of Classification Search
CPC .. B64D 27/02; B64D 27/24; B64D 2027/026; F16H 1/28; F16H 57/0416; F16H 2057/02034
See application file for complete search history.

(56) References Cited

U.S. PATENT DOCUMENTS

| 4,869,071 A | 9/1989 | Wehner et al. |
| 6,496,397 B2 | 12/2002 | Sakai et al. |

(Continued)

FOREIGN PATENT DOCUMENTS

| CA | 3033189 A1 | 2/2018 |
| CN | 1940345 A * | 4/2007 |

(Continued)

OTHER PUBLICATIONS

PCT International Search Report and Written Opinion dated Aug. 7, 2020, issued during the prosecution of PCT International Patent Application No. PCT/US2019/065021.

(Continued)

*Primary Examiner* — Derek D Knight
(74) *Attorney, Agent, or Firm* — Norton Rose Fulbright Canada LLP

(57) ABSTRACT

A hybrid-electric powertrain system for aircraft includes a gearbox having a first rotary shaft for output to drive an air mover for aircraft thrust. The system includes a first prime mover connected by a second rotary shaft to the gearbox for power input to the gearbox. Further, the system includes a second prime mover connected by a third rotary shaft to the gearbox. The second prime mover can have a hollow core, and at least one of the first and second rotary shafts passes through the hollow core and the third rotary shaft.

18 Claims, 3 Drawing Sheets

(51) Int. Cl.
   *B64D 27/24*   (2006.01)
   *B64D 33/08*   (2006.01)
   *F16H 57/02*   (2012.01)
   *F16H 57/04*   (2010.01)

(56) References Cited

U.S. PATENT DOCUMENTS

| | | |
|---|---|---|
| 7,358,698 B2 | 4/2008 | Seguchi et al. |
| 7,425,806 B2 | 9/2008 | Schnetzka et al. |
| 8,047,420 B2 | 11/2011 | Stroh |
| 8,169,179 B2 | 5/2012 | Mohan et al. |
| 8,196,299 B2 | 6/2012 | Lee et al. |
| 8,279,620 B2 | 10/2012 | Herron et al. |
| 8,376,069 B2 | 2/2013 | Nakatsu et al. |
| 8,587,977 B2 | 11/2013 | Nishikimi et al. |
| 8,648,559 B2 | 2/2014 | Singh |
| 8,884,479 B2 | 11/2014 | Burnett et al. |
| 8,964,424 B2 | 2/2015 | Sakakibara |
| 9,006,942 B2 | 4/2015 | Lemmers, Jr. et al. |
| 9,077,257 B2 | 7/2015 | Frium |
| 9,306,433 B2 | 4/2016 | Sten et al. |
| 9,341,145 B2 | 5/2016 | Maier |
| 9,496,802 B2 | 11/2016 | Matsumoto |
| 9,564,257 B2 | 2/2017 | Karlen et al. |
| 9,647,556 B2 | 5/2017 | Li et al. |
| 9,787,217 B2 | 10/2017 | Hu et al. |
| 9,853,573 B2 | 12/2017 | Siri |
| 9,923,431 B2 * | 3/2018 | Mountain ............... H02P 27/04 |
| 9,923,485 B2 | 3/2018 | Fu et al. |
| 9,954,335 B2 | 4/2018 | Hasegawa et al. |
| 10,086,946 B1 | 10/2018 | Zywiak et al. |
| 10,122,165 B2 | 11/2018 | Zare |
| 10,138,899 B2 | 11/2018 | Joubert et al. |
| 10,141,829 B2 | 11/2018 | Fullmer et al. |
| 10,150,570 B2 | 12/2018 | Joubert et al. |
| 10,177,424 B1 | 1/2019 | Melack et al. |
| 10,374,329 B2 | 8/2019 | Ruess et al. |
| 10,425,032 B2 | 9/2019 | Tapadia et al. |
| 10,432,129 B2 | 10/2019 | Mori et al. |
| 2006/0237583 A1 | 10/2006 | Fucke et al. |
| 2007/0163822 A1 | 7/2007 | Grieve |
| 2008/0058145 A1 * | 3/2008 | Holmes ............... B60K 6/445 475/5 |
| 2010/0006073 A1 | 1/2010 | Jatkar |
| 2010/0038473 A1 | 2/2010 | Schneider et al. |
| 2010/0254081 A1 | 10/2010 | Koenig et al. |
| 2010/0282439 A1 | 11/2010 | Summerer |
| 2011/0108239 A1 | 5/2011 | Bruno et al. |
| 2012/0192578 A1 | 8/2012 | Finney |
| 2012/0277059 A1 | 11/2012 | Akutsu et al. |
| 2013/0181088 A1 | 7/2013 | Casado Montero et al. |
| 2013/0277009 A1 | 10/2013 | Army |
| 2013/0300120 A1 | 11/2013 | Podrog |
| 2013/0341934 A1 | 12/2013 | Kawanishi |
| 2014/0318132 A1 | 10/2014 | Podrog |
| 2014/0345281 A1 | 11/2014 | Galbraith |
| 2017/0043656 A1 | 2/2017 | Hashimoto et al. |
| 2017/0291712 A1 | 10/2017 | Himmelmann et al. |
| 2017/0305559 A1 | 10/2017 | Bruno et al. |
| 2017/0306786 A1 | 10/2017 | Bruno et al. |
| 2018/0050810 A1 | 2/2018 | Niergarth et al. |
| 2018/0050811 A1 | 2/2018 | Niergarth et al. |
| 2019/0010866 A1 | 1/2019 | Snyder et al. |
| 2019/0014687 A1 | 1/2019 | Snyder |
| 2019/0322379 A1 | 10/2019 | Mackin |
| 2020/0325829 A1 | 10/2020 | Kupratis |
| 2020/0354068 A1 * | 11/2020 | Razak ....................... F02K 5/00 |

FOREIGN PATENT DOCUMENTS

| | | | |
|---|---|---|---|
| CN | 207826569 U * | 9/2018 | ............. B64D 27/02 |
| CN | 207826569 U | 9/2018 | |
| DE | 102004036296 A1 | 2/2006 | |
| DE | 102010021890 A1 | 12/2011 | |
| DE | 102010034830 A1 | 2/2012 | |
| DE | 102011105968 A1 | 1/2013 | |
| EP | 1129891 A2 | 9/2001 | |
| EP | 1947008 A1 | 7/2008 | |
| EP | 2458717 A2 | 5/2012 | |
| EP | 2482438 A2 | 8/2012 | |
| EP | 2809540 A1 | 12/2014 | |
| EP | 3142230 A1 | 3/2017 | |
| EP | 3163990 A1 | 5/2017 | |
| EP | 3252930 A1 | 12/2017 | |
| EP | 3090951 B1 | 12/2018 | |
| EP | 3547528 A1 | 10/2019 | |
| JP | 2006231974 A | 9/2006 | |
| JP | 2009187756 A | 8/2009 | |
| JP | 2016001589 A | 1/2016 | |
| KR | 20060094418 A | 8/2006 | |
| KR | 20130073244 A | 7/2013 | |
| WO | 200561323 A1 | 7/2005 | |
| WO | 2007149857 A2 | 12/2007 | |
| WO | 2009156120 A2 | 12/2009 | |
| WO | 201081123 | 7/2010 | |
| WO | 2011147977 A2 | 12/2011 | |
| WO | 2011153533 A2 | 12/2011 | |
| WO | 2012118140 A1 | 9/2012 | |
| WO | 2012167274 A1 | 12/2012 | |
| WO | 2013113006 A1 | 8/2013 | |
| WO | 2015073084 A1 | 5/2015 | |
| WO | 201682325 | 6/2016 | |
| WO | 201733320 | 3/2017 | |
| WO | 2017114643 A1 | 7/2017 | |
| WO | 2018191769 A1 | 10/2018 | |
| WO | 2018227270 A1 | 12/2018 | |
| WO | 2020079369 A1 | 4/2020 | |

OTHER PUBLICATIONS

Extended European Search Report dated May 16, 2022, issued during the prosecution of European Patent Application No. EP 22150379.0.

* cited by examiner

PARALLEL HYBRID POWER PLANT WITH HOLLOW MOTOR

CROSS-REFERENCE TO RELATED APPLICATIONS

This is a continuation of U.S. patent application Ser. No. 17/142,085 filed Jan. 5, 2021 the content of which is incorporated by reference herein in its entirety.

BACKGROUND

1. Field of the Invention

The present disclosure relates to aircraft power trains, and more particularly to hybrid aircraft powertrains.

2. Description of Related Art

Aircraft power trains vary in efficiency and function over a plurality of parameters, such as thrust requirements, air temperature, air speed, altitude, and the like. Aircraft require the most thrust at take-off, wherein the demand for engine power is the heaviest. However, during the remainder of the mission, the aircraft engines often do not require as much thrust as during take-off. The size and weight of the engines allows them to produce the power needed for take-off, however after take-off the engines are in effect over-sized for the relatively low power required to produce thrust for cruising in level flight.

The conventional techniques have been considered satisfactory for their intended purpose. However, there is an ever present need for improved aircraft power trains.

SUMMARY

A hybrid-electric powertrain system for aircraft includes a gearbox having a first rotary shaft for output to drive an air mover for aircraft thrust. The system includes a first prime mover connected by a second rotary shaft to the gearbox for power input to the gearbox. Further, the system includes a second prime mover connected by a third rotary shaft to the gearbox. The second prime mover can have a hollow core, and at least one of the first and second rotary shafts passes through the hollow core and the third rotary shaft. A cooling air path can be defined through the hollow core, and a radial air passage receiving air from the hollow core, the radial air passage extending radially between the second prime mover and the gearbox and being in heat exchange with the second prime mover.

The first prime mover and the second prime mover can both be on one side of the gearbox, so that the second prime mover is between the gearbox and the first prime mover, and the second rotary shaft passes through the hollow core and through the third rotary shaft. The second prime mover and first prime mover can be on opposite sides of the gearbox, so that the first rotary shaft passes through the hollow core and through the third rotary shaft.

The gearbox can be configured to receive rotary power input in parallel from the second and third rotary shafts and to output rotary power to the first rotary shaft so that power from either or both of the second prime mover and the first prime mover can power the first rotary shaft.

The gearbox can include a planetary gear set including a sun gear connected to drive the first rotary shaft, a ring gear connected to receive input from the third rotary shaft, and a set of planetary gears meshing between the ring gear and the sun gear. The planetary gears can all be connected to a carrier that is connected to receive input from the second rotary shaft.

The first shaft can be connected to an air mover, where the air mover is positioned to move air through the cooling path. The second prime mover can be an electric mover that can include a stator mounted stationary relative to the gearbox, and a rotor within the stator, where the rotor is connected to the third rotary shaft for rotary input to the gearbox. A plurality of spokes can connect the rotor to the third rotary shaft.

The first prime mover can be a thermal engine. The second prime mover can be an electrical machine. The gearbox can be configured to provide a predetermined output speed to the first rotary shaft when at least one of: the second rotary shaft provides power input to the gearbox at a first input speed and the third rotary shaft concurrently provides power input to the gearbox at the first input speed, and/or the second rotary shaft provides power input to the gearbox at a second input speed and the third rotary shaft concurrently provides power input to the gearbox at a third input speed, the third input speed being different from the second input speed A method comprises, in a hybrid electric drive train, driving a gearbox with a first prime mover and a second prime mover to drive an air mover for aircraft thrust with the first and second prime movers providing power input to the gearbox in parallel. Driving the gearbox includes conveying power input from the first prime mover to the gearbox via a hollow core of the second prime mover.

The method can include cooling the second prime mover with a flow of air through the hollow core. Cooling the second prime mover with a flow of air can include driving the air with the air mover into the hollow core.

All of the thrust can be provided by the first prime mover while the second prime mover can be idle during cruise. Both the first and second prime movers can contribute to full power required by the aircraft to the gearbox during takeoff and climb. Both the first and second prime movers can contribute a portion of power, but unequally relative to each other, to drive the gearbox.

The second prime mover can be an electrical machine, so the method can further include driving the electrical machine in a generator mode with power from the first prime mover during battery recharge on the ground or by wind milling a propeller during flight. The second prime mover can be an electrical machine, so the method can also include using power from the electrical machine input to the gearbox to drive the first prime mover to start the first prime mover.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
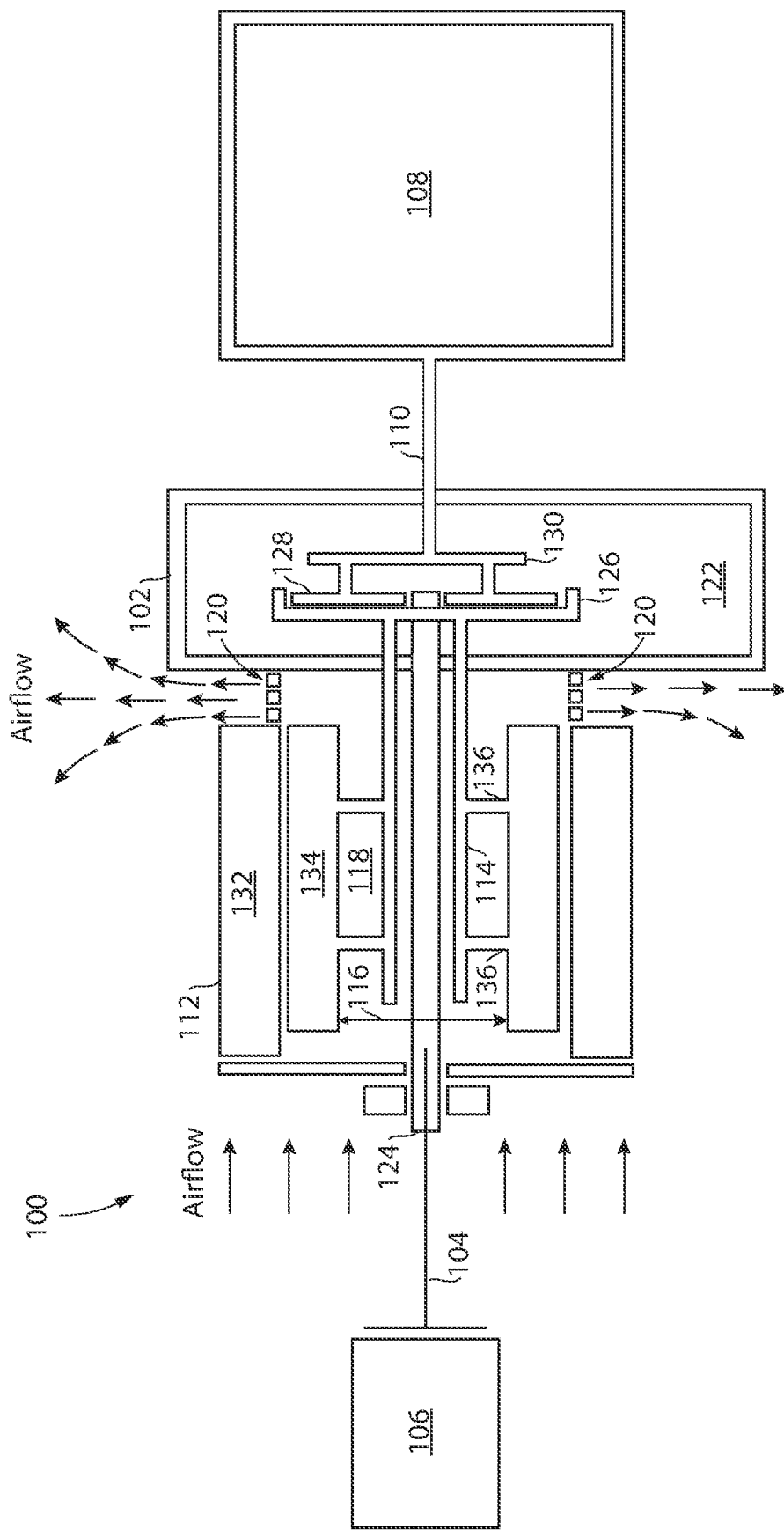
FIG. 1 is a schematic view of an embodiment of a system constructed in accordance with the present disclosure, showing a plurality of prime movers connected to an air mover through a gearbox.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIGS. 2-4, as will be described. The systems and methods described herein can have many different applications. Among other functions, the systems and methods described herein can be used to cool a prime mover of a power plant.

A system 100 (e.g. a hybrid-electric powertrain for aircraft) can include a gearbox 102 having a first rotary shaft 104 for output to drive an air mover 106 for aircraft thrust. In some embodiments, such as the present embodiment, the air mover 106 is a propeller. It is contemplated that in other embodiments the air mover 106 may be of a different type, such as but not limited to a helicopter rotor for example. The system 100 can include a first prime mover 108 connected by a second rotary shaft 110 to the gearbox 102 for power input to the gearbox 102.

Further, the system 100 can include a second prime mover 112 connected by a third rotary shaft 114 to the gearbox 102. The second prime mover 112 can have a hollow core 116, and at least one of the first and second rotary shafts 104,110 can pass through the hollow core 116 and third rotary shaft 114. A cooling air path 118 can be defined through the hollow core 116, and for example through a radial air passage 120 downstream of the hollow core 116. The air can flow through the radial air passage 120 and exit radially between the second prime mover 112 and the gearbox 102 so that the radial air passage 120 can be in heat exchange with the second prime mover 112, for example, for cooling the second prime mover 112.

Figure 2:
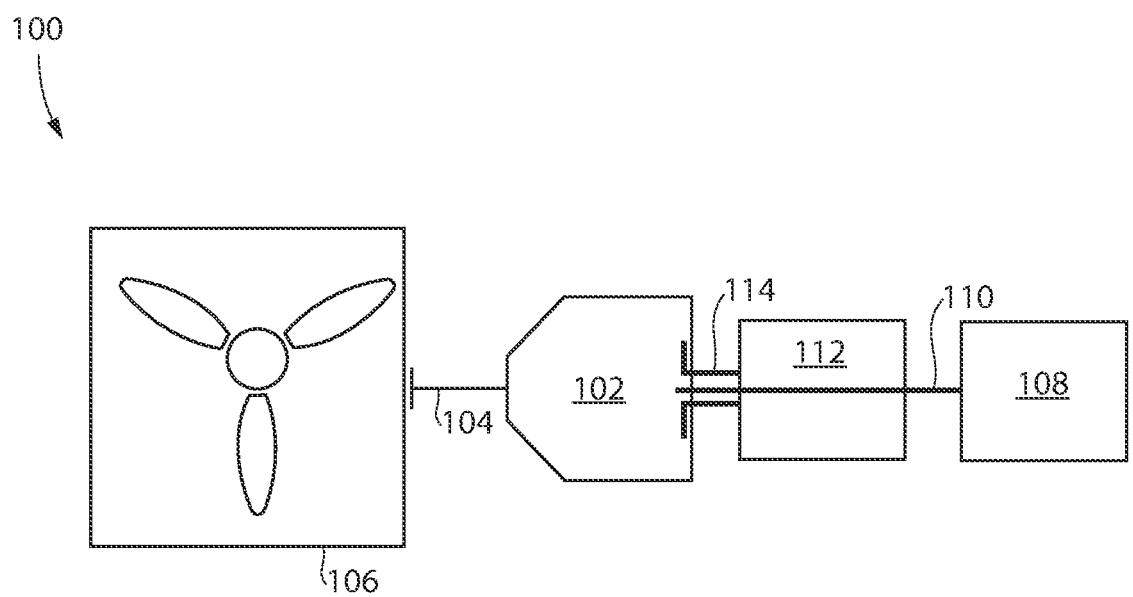
FIG. 2 is a schematic diagram of an embodiment of the system of FIG. 1 showing a configuration of the prime movers of FIG. 1 with respect to the gearbox.
Figure 3:
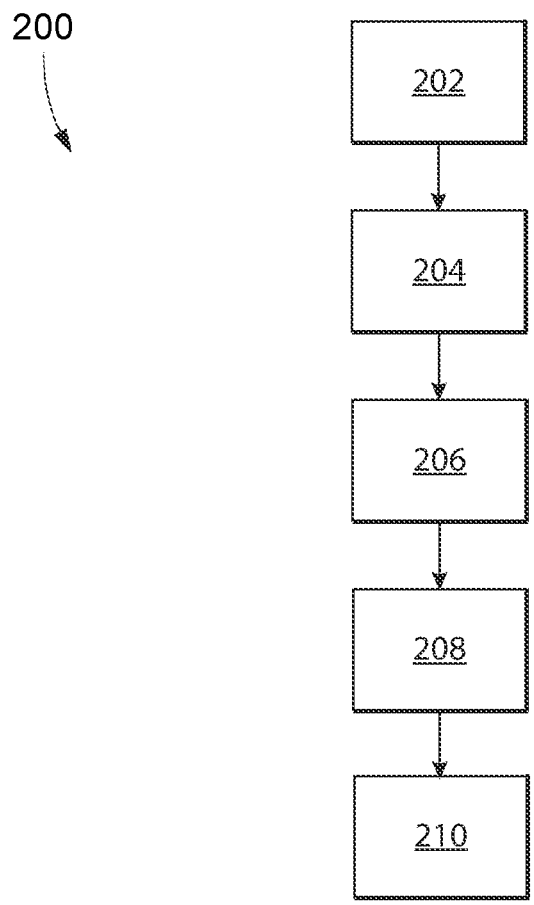
FIG. 3 is a schematic box diagram of a method in accordance with at least one aspect of this disclosure.

In embodiments, such as the example shown in FIG. 2, the first prime mover 108 and the second prime mover 112 can both be on one side of the gearbox 102, for example on a common lateral side. In that case, the second prime 112 mover can be between the gearbox 102 and the first prime mover 108, and the second rotary shaft 110 can pass through the hollow core 116 and through the third rotary shaft 114. It is also possible however that, as in the example shown in FIG. 1, the second prime mover 112 and first prime mover 108 can be on opposite lateral sides of the gearbox 102. There, the first rotary shaft 104 can pass through the hollow core 116 and through the third rotary shaft 114.

The gearbox 102 can be configured to receive rotary power input in parallel from the second and third rotary shafts 110,114 and to output rotary power to the first rotary shaft 104, so that power from either or both of the second prime mover 112 and first prime mover 108 can power the air mover 106 via first rotary shaft 104. The gearbox 102 can include a planetary gear set 122 including a sun gear 124, a ring gear 126, and a set of planetary gears 128. The sun gear 124 can be connected to drive the first rotary shaft 104, the ring gear 126 can be connected to receive input from the third rotary shaft 114, and the planetary gears 128 can be meshed between the ring gear 126 and the sun gear 124. The planetary gears 128 can all be connected to a carrier 130 which can be connected to receive input from the second rotary shaft 110.

Still with reference to FIG. 1, the first shaft 104 can be connected to the air mover 106, where the air mover 106 is positioned to move air through the cooling path 118. The second prime mover 112 can be an electric mover that can include a stator 132 mounted stationary relative to the gearbox 102, and a rotor 134 within the stator 132. The rotor 134 can be connected to the third rotary shaft 114 for rotary input to the gearbox 102. To maintain the hollow core 116, a plurality of spokes 136 can connect the rotor 134 to the third rotary shaft 114.

In embodiments, the first prime mover 108 can be a thermal engine, while the second prime mover 112 can be an electrical machine. When the second prime mover 112 is an electrical machine, it may also serve as a generator configured to recharge electrical energy storage. Thus, the gearbox 102 can be configured to provide a predetermined output speed to the first rotary shaft 104 even when power input from the second and third rotary shafts 110,114 is provided at two different speeds. For example, the second rotary shaft 110 can provide input to the gearbox 102 at a first rotation speed and the third rotary shaft 114 can provide input to the gearbox 102 at a second rotation speed that is different from the first rotation speed.

A method 200 according to the present technology can comprises, in a hybrid electric drive train, driving a gearbox 102 with a first prime mover 108 and a second prime mover 112 to drive an air mover 106 for aircraft thrust with the first and second prime movers 108,112 in parallel, as shown at box 202. The method 200 can include, at box 204, cooling the second prime mover 112 with a flow of air through the hollow core 116. Cooling the second prime mover 112 with a flow of air can include, at box 206, driving the air with the air mover 106 into the hollow core 116. For example cooling can be driving air into the hollow core 116 as propeller wash from a propeller (e.g. air mover 106) connected to a rotary output of the gearbox 102 flows downstream of the propeller towards the second prime mover 112.

In the method 200, all of the thrust can be provided by the first prime mover 108 while the second prime mover 112 can remain idle during cruise. During takeoff and climb, both the first and second prime movers 108,112 can contribute all of the power required by the aircraft to the gearbox 102. Additionally, or alternatively, both the first and second prime movers 108,112 can contribute a portion of power, but unequally relative to each other, to drive the gearbox 102.

If the second prime mover 112 is an electrical machine, the method 200 can further include, at box 208, driving the electrical machine in a generator mode with power from the first prime mover 108 during battery recharge on the ground, or by wind milling a propeller during flight. When the second prime mover 112 is an electrical machine, the method 200 can also include, at box 210, using power from the electrical machine input to the gearbox 102 to drive the second rotary shaft to start the first prime mover 108.

A hybrid power plant, such as the system 100 described above, can combine power input from two different sources, such as a heat engine and an electrical motor (e.g. prime movers 108,112). The heat engine and electrical motor do not operate at the same speed. It is possible that a hybrid power plant can be installed in a parallel or series architecture, however a parallel architecture provides its own advantages. For example, a long cylindrical form and parallel architecture can be more easily fit within an airplane nacelle. Additionally, the parallel architecture allows the propeller to be independently driven by either of prime movers 108,112, or the combination of the prime movers.

The prime movers 108,112 can be an electric motor and/or thermal engine as described herein, however it should be appreciated by those skilled in the art that the prime movers are not limited to these two possibilities. As described above, the prime movers and air mover are mechanically coupled through the planetary gear system. The planetary gear system can be designed to a specific combination of gear ratio, which can convert two inputs of different speed to achieve a desirable output speed. While a conventional planetary gear system may be used, the arrangement of the hollow core electrical motor within a hybrid power plant allows for improved cooling of the electric prime mover.

Hybrid power plants can add additional weight to an aircraft, and consume more space than a conventional system, therefore it is paramount to create a compact hybrid power plant layout, without sacrificing functionality and maintenance access. For example, the electrical motor needs to be compact and high power to weight ratio. Typically, for an AC electrical motor, the stator with the winding is flooded with coolant. However, in a hybrid system it is also necessary to cool the magnets within the rotor, otherwise, with increase in temperature, the magnetic may become demagnetized and as a result, the overall efficiency of the motor is degraded. The conventional cooling techniques used for an AC motor are not suitable for a hybrid electric system as described.

Therefore, using a hollow core, such as the hollow core 116 as described above, the motor can have a larger diameter, allowing more space for the stator winding, while the rotor has increased surface exposed to ambient air for cooling. Nature or force convection, e.g. air from the air mover, can be a cost efficient solution to cool the magnet in the rotor, extending the useable of the magnets.

The methods and systems of the present disclosure, as described above and shown in the drawings, provide for improved cooling within a hybrid power plant. While the apparatus and methods of the subject disclosure have been shown and described, those skilled in the art will readily appreciate that changes and/or modifications may be made thereto without departing from the scope of the subject disclosure.

What is claimed is:

1. A hybrid-electric powertrain system for aircraft, the system comprising:
   a gearbox having a first rotary shaft for output to drive an air mover for aircraft thrust;
   a first prime mover connected by a second rotary shaft to the gearbox for power input to the gearbox; and
   a second prime mover connected by a third rotary shaft to the gearbox,
   wherein:
     the second prime mover has a hollow core;
     the first prime mover and the second prime mover are both on one side of the gearbox;
     the second prime mover is between the gearbox and the first prime mover;
     the second rotary shaft passes through the hollow core and through the third rotary shaft;
     a cooling air path is defined through the hollow core; and
     the air mover is positioned to move air through the cooling air path.

2. The system as recited in claim 1, wherein the gearbox is configured to receive rotary power input in parallel from the second and third rotary shafts and to output rotary power to the first rotary shaft so that power from either or both of the second prime mover and the first prime mover can power the first rotary shaft.

3. The system as recited in claim 1, wherein the gearbox includes a planetary gear set including a sun gear connected to drive the first rotary shaft, a ring gear connected to receive input from the third rotary shaft, and a set of planetary gears meshing between the ring gear and the sun gear, wherein the planetary gears are all connected to a carrier that is connected to receive input from the second rotary shaft.

4. The system as recited in claim 1, wherein a radial air passage is configured to receive air from the hollow core, the radial air passage extending radially between the second prime mover and the gearbox and being in heat exchange with the second prime mover.

5. The system as recited in claim 4, wherein the first rotary shaft is connected to the air mover.

6. The system as recited in claim 1, wherein the second prime mover is an electric mover that includes a stator mounted stationary relative to the gearbox, and a rotor within the stator, and the rotor is connected to the third rotary shaft for rotary input to the gearbox.

7. The system as recited in claim 6, wherein a plurality of spokes connect the rotor to the third rotary shaft.

8. The system as recited in claim 1, wherein the first prime mover is a thermal engine.

9. The system as recited in claim 1, wherein the second prime mover is an electrical machine.

10. The system as recited in claim 1, wherein the gearbox is configured to provide a predetermined output speed to the first rotary shaft when at least one of:
    the second rotary shaft provides power input to the gearbox at a first input speed and the third rotary shaft concurrently provides power input to the gearbox at the first input speed, and/or
    the second rotary shaft provides power input to the gearbox at a second input speed and the third rotary shaft concurrently provides power input to the gearbox at a third input speed, the third input speed being different from the second input speed.

11. A method comprising:
    in a hybrid electric drive train:
      driving a gearbox with a first prime mover and a second prime mover to drive an air mover for aircraft thrust with the first and second prime movers providing power input to the gearbox in parallel, wherein driving the gearbox includes conveying power input from the first prime mover to the gearbox via a hollow core of the second prime mover; and
      cooling the second prime mover with a flow of air through the hollow core.

12. The method as recited in claim 11, wherein cooling the second prime mover with a flow of air includes driving the air with the air mover into the hollow core.

13. The method as recited in claim 11, wherein all of the thrust is provided by the first prime mover and the second prime mover is idle during cruise.

14. The method as recited in claim 11, wherein both the first and second prime movers each contribute all power required by an aircraft to the gearbox during takeoff and climb.

15. The method as recited in claim 11, wherein both the first and second prime movers contribute a portion of power, but unequally relative to each other, to drive the gearbox.

16. The method as recited in claim 11, wherein the second prime mover is an electrical machine and further comprising, driving the electrical machine in a generator mode with power from the first prime mover during battery recharge on the ground or by wind milling a propeller during flight.

17. The method as recited in claim 11, wherein the second prime mover is an electrical machine and further comprising using power from the electrical machine input to the gearbox to drive the first prime mover to start the first prime mover.

18. A hybrid-electric powertrain system for aircraft, the system comprising:
a gearbox having a first rotary shaft for output to drive an air mover for aircraft thrust;
a first prime mover connected by a second rotary shaft to the gearbox for power input to the gearbox;
a second prime mover connected by a third rotary shaft to the gearbox,
wherein:
the second prime mover has a hollow core;
the first prime mover and the second prime mover are both on one side of the gearbox;
the second prime mover is between the gearbox and the first prime mover;
the second rotary shaft passes through the hollow core and through the third rotary shaft;
the second prime mover is an electric mover that includes a stator mounted stationary relative to the gearbox, and a rotor within the stator;
the rotor is connected to the third rotary shaft for rotary input to the gearbox; and
a plurality of spokes connect the rotor to the third rotary shaft.

* * * * *